W. H. THIEMER.
UNIVERSAL JOINT.
APPLICATION FILED JUNE 20, 1919.

1,376,840.

Patented May 3, 1921.

Inventor,
William H. Thiemer,
By Hull, Smith, Brock & West,
Attys.

UNITED STATES PATENT OFFICE.

WILLIAM H. THIEMER, OF CLEVELAND, OHIO, ASSIGNOR TO THE PETERS MACHINE & MANUFACTURING COMPANY, OF CLEVELAND, OHIO, A CORPORATION OF OHIO.

UNIVERSAL JOINT.

1,376,840.   Specification of Letters Patent.   Patented May 3, 1921.

Application filed June 20, 1919. Serial No. 305,642.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints, and has for its general object to provide a construction which will permit of ease of assembling the parts thereof and secure efficient and economical lubrication of the bearings for the trunnions, the invention being particularly adapted for use with the ring type of connection between the opposed shaft sections.

Figure 1:
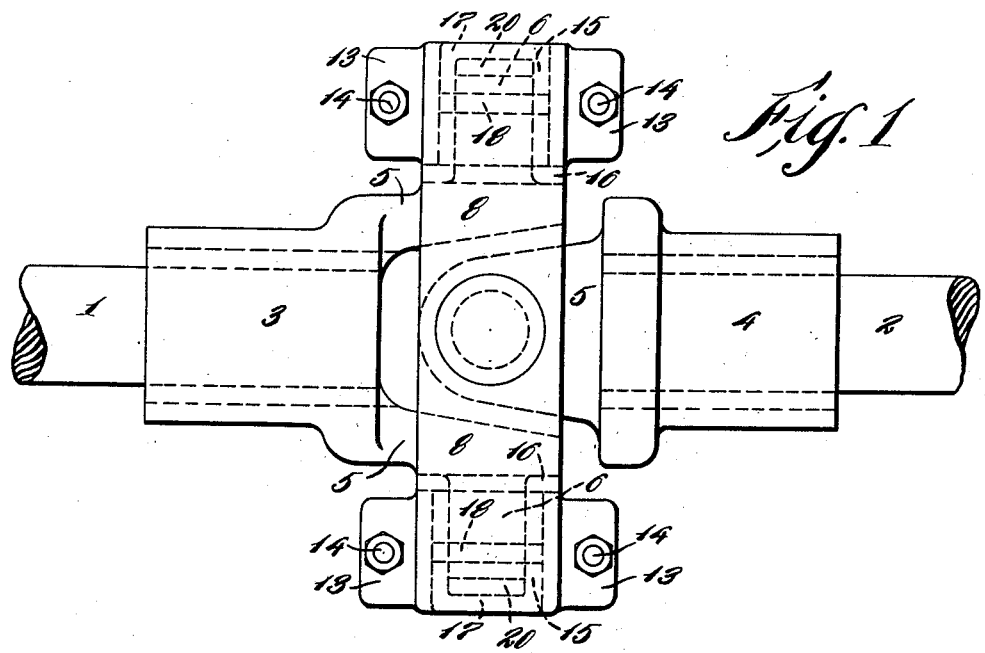
Figure 2:
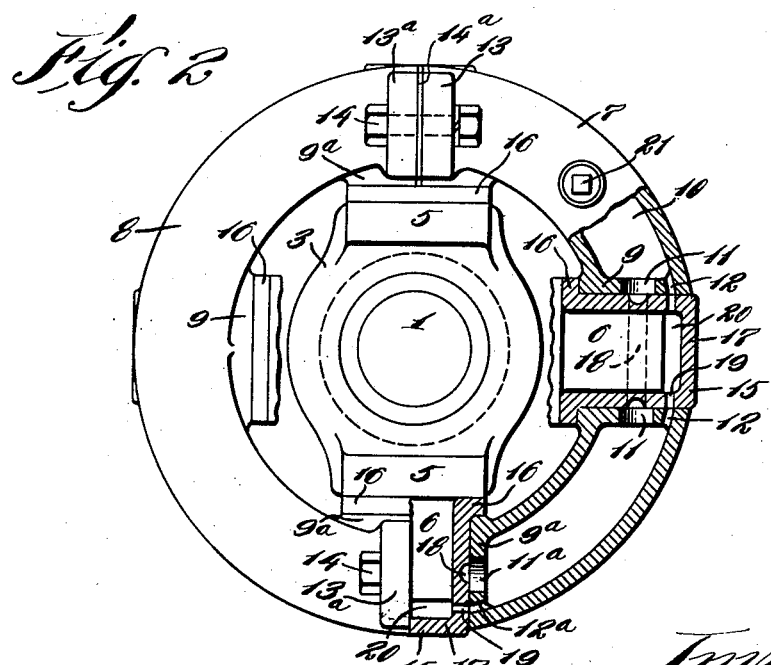

In the drawings forming part hereof, Figure 1 represents a side elevation of a universal joint constructed in accordance with my invention; and Fig. 2 a view, partly in plan and partly in section, of such joint, one of the shaft sections and its trunnions being omitted.

Describing the various parts by reference characters, 1 and 2 denote shaft sections, provided respectively with the hubs 3 and 4, each hub being forked, as shown at 5, and each of the forks or branches being provided with a trunnion 6.

The shaft sections are connected, through their hubs and trunnions, by means of a two-part ring, the sections or members of said ring being indicated respectively at 7 and 8. Each ring member comprises a hollow half-ring section provided with a complete journal for a trunnion and with two half journals. Referring to the ring section 7, the journal, indicated at 9, extends entirely across the hollow interior 10 of said section and is provided with a pair of opposed ports 11, each communicating with the hollow portion of the ring section, and with opposed additional ports 12, located at opposite sides of the outer end of the journal and communicating with the hollow interior of the ring section adjacent to the outer wall thereof. A similar journal is provided in the ring section 8. One of the two half journals of the ring section 7 is shown at 9ª, and this half journal is provided with a port 11ª and a port 12ª similar to the ports 11 and 12. The ring section 8 is provided with a pair of half journals forming, with the journals 9ª, complete journals and having ports corresponding to the ports 11ª and 12ª and communicating with the hollow interior of the section 8.

Each ring section 7 and 8 is provided at its ends with lugs 13 and 13ª respectively, said lugs being adapted to be united by bolts 14, the spaces between the opposed ends of the ring sections and between said lugs being provided with suitable packing 14ª.

Within each journal there is mounted a bushing 15 having at its inner end a shoulder 16 adapted to engage the inner end of the journal, the outer end of the bushing being closed to form a cap 17 which is preferably flush with the outer surface of the ring. Each bushing is provided with a circumferential external groove 18 adapted to register with the ports 11, 11ª and with ports 19 adapted to register with the ports 12, 12ª.

These bushings are intended and adapted to receive the trunnions 6, the trunnions preferably terminating within the outer ends of their respective bushings, thereby to provide a space for a well 20 beyond the end of each trunnion through which lubricant, supplied to the hollow interior of the ring, as through a filling opening closed by a removable plug 21, may circulate.

In assembling the joint, the bushings may be inserted within their journals; or all of the bushings may be placed upon their respective trunnions. The ring sections may then be brought together, thus assembling the trunnions and bushings within their respective journals, after which the ring sections may be connected by means of the bolts 14 and lugs 13, 13ª.

Lubricant inserted into the hollow ring will, by centrifugal action, be distributed about the bushings 15 by means of the ports 11 and annular recesses 18. Through centrifugal action, as long as any material amount of lubricant remains within the ring, it will be distributed through the ports 12 into the chambers 20 and thus serve to lubricate the trunnions 6.

Having thus described my invention, what I claim is:—

1. In a universal joint, the combination of a pair of shaft sections each having a pair of trunnions, a pair of hollow ring sections each having a journal intermediate the ends thereof and a half journal at each end thereof, the trunnions being mounted in said journals, means for connecting the opposed ends of said ring sections, and means for conducting lubricant from the hollow interior of such ring to the said journals.

2. In a universal joint, the combination of a pair of shaft sections each having a pair of trunnions, a pair of connecting member sections each having a journal intermediate the ends thereof and a journal section at each end thereof, the trunnions being mounted in said journals, and means for connecting the opposed ends of said sections.

3. In a universal joint, the combination of a pair of shaft sections each having a pair of trunnions, a pair of hollow ring sections each having a journal intermediate the ends thereof and a half journal at each end thereof, means for connecting the opposed ends of said ring sections, a bushing in each journal of the ring and surrounding the trunnion therein and extending beyond the same, there being a circumferential passageway provided about each bushing between the same and its journal and each journal being provided with a pair of ports communicating with said groove and with the hollow interior of said ring, and means for conducting lubricant by centrifugal action from the interior of said ring to the interior of each bushing.

4. In a universal joint, the combination of a pair of shaft sections each having a pair of trunnions, a pair of hollow ring sections, each section having a journal intermediate the ends thereof and a half journal at each end thereof for the reception of said trunnion, means for connecting the opposed ends of said ring sections, there being a passageway provided about each trunnion within its journal, and means for conducting lubricant by centrifugal action from the interior of said ring to the said journals.

5. In a universal joint, the combination of a pair of shaft sections each having a pair of trunnions, a pair of hollow ring sections each provided with a journal intermediate the end thereof extending across the hollow interior thereof and with similar half journals at each end thereof, and bushings mounted within the journals of the ring and having their outer ends closed, the trunnions being mounted in said bushings and terminating short of the outer ends thereof, each journal of the complete ring being provided intermediate the ends thereof with a pair of ports and at the outer end thereof with a second pair of ports, said ports communicating with the hollow interior of said ring, and each bushing having a circumferential groove extending therearound and adapted to register with the first pair of ports and also having a pair of ports located beyond the end of the trunnion therein and communicating with the other ports in said journal.

6. In a universal joint, the combination of a pair of shaft sections each having a pair of trunnions, a pair of hollow ring sections each provided with a journal intermediate the ends thereof extending across the hollow interior thereof and with similar half journals at each end thereof, and bushings mounted within the journals of the ring and having their outer ends closed, the trunnions being mounted in said bushings and terminating short of the outer ends thereof, each journal of the complete ring being provided intermediate the ends thereof with a by-pass communicating with the interior of the ring and with means for circulating the lubricant from the interior of said ring through the outer ends of said bushings.

In testimony whereof, I hereunto affix my signature.

WILLIAM H. THIEMER.